United States Patent [19]
Moncrief et al.

[11] Patent Number: 5,354,202
[45] Date of Patent: Oct. 11, 1994

[54] SYSTEM AND METHOD FOR DRIVER TRAINING WITH MULTIPLE DRIVER COMPETITION

[75] Inventors: Rick L. Moncrief; Stephanie J. Mott, both of San Jose; Max L. Behensky, Hayward; Jed Margolin, San Jose, all of Calif.

[73] Assignee: Atari Games Corporation, Milpitas, Calif.

[21] Appl. No.: 80,582

[22] Filed: Jun. 18, 1993

Related U.S. Application Data

[63] Continuation of Ser. No. 739,906, Aug. 1, 1991, abandoned, which is a continuation-in-part of Ser. No. 561,087, Aug. 1, 1990, abandoned.

[51] Int. Cl.⁵ .............................................. G09B 9/04
[52] U.S. Cl. .................................. 434/69; 434/65; 434/307 R; 434/373; 364/410; 364/578; 273/86 B; 273/434; 273/454; 273/DIG. 28; 345/4
[58] Field of Search ............... 434/29, 38, 307, 308; 273/85 G, 86 R, 86 B, 434, 437, 440, 442, 445, 454, DIG. 28; 364/410, 578; 395/152; 348/121; 345/4

[56] References Cited

U.S. PATENT DOCUMENTS

| | | |
|---|---|---|
| 4,383,827 | 5/1983 | Foerst . |
| 4,710,873 | 12/1987 | Brisbois et al. ............... 273/85 G X |
| 4,716,458 | 12/1987 | Heitzman et al. . |
| 4,750,888 | 6/1988 | Allard et al. . |
| 4,760,388 | 7/1988 | Tatsumi et al. .................. 434/69 X |
| 5,005,148 | 4/1991 | Behensky ........................ 434/69 X |
| 5,269,687 | 12/1993 | Mott et al. ............................. 434/69 |

FOREIGN PATENT DOCUMENTS

| | | |
|---|---|---|
| 0145598 | 6/1985 | European Pat. Off. . |
| 0404381 | 12/1990 | European Pat. Off. . |
| 3816543 | 11/1989 | Fed. Rep. of Germany . |
| 8620293 | 4/1990 | Fed. Rep. of Germany . |
| 9000851 | 4/1990 | Fed. Rep. of Germany . |
| 8806776 | 9/1988 | World Int. Prop. O. .......... 482/902 |
| 9111792 | 8/1991 | World Int. Prop. O. . |

OTHER PUBLICATIONS

"Hard Drivin'" Advertising Brochure, Atari Games Corporation, 1988.
"Hard Drivin'Operator's Manual", Atari Games Corporation, pp. ii, 1-4, 1-5, 1989.

*Primary Examiner*—Richard J. Apley
*Assistant Examiner*—Joe H. Cheng
*Attorney, Agent, or Firm*—Knobbe, Martens, Olson & Bear

[57] ABSTRACT

A driver training system for a user of a simulated vehicle. The system includes input devices for controlling the simulated vehicle, a video display having three-dimensional graphics, modeling software for determining position information based on the input devices, and recursive training software to display a previous route through an environment simultaneously with a present route through the environment. The user then incrementally and recursively maximizes parameters associated with vehicle operation skill. In addition, a present user may compete with one or more previous users by having previously recorded routes played back on the video display simultaneously with the route of the present user. The driver training system may be embodied as an arcade game.

10 Claims, 11 Drawing Sheets

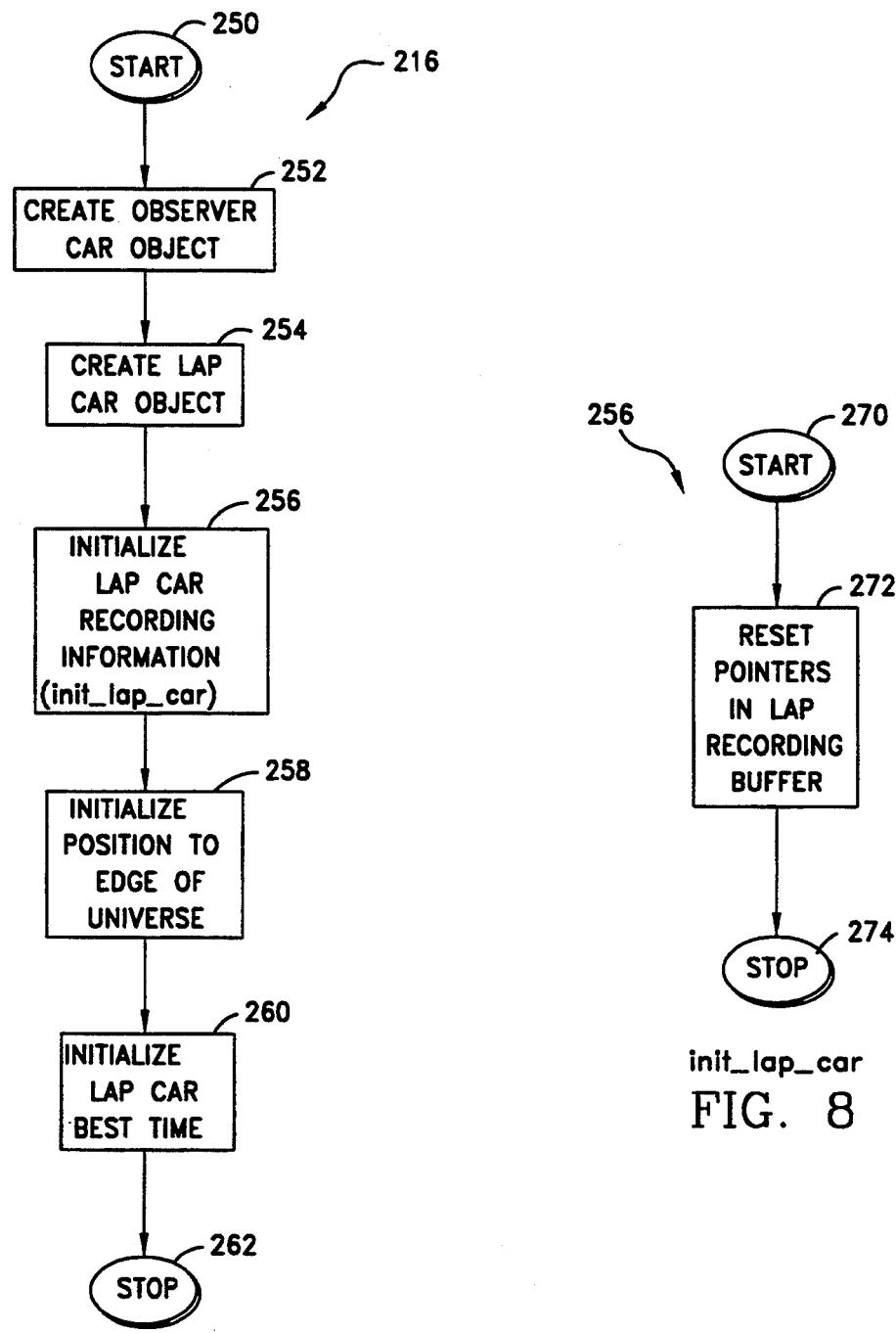

buddy_gameplay

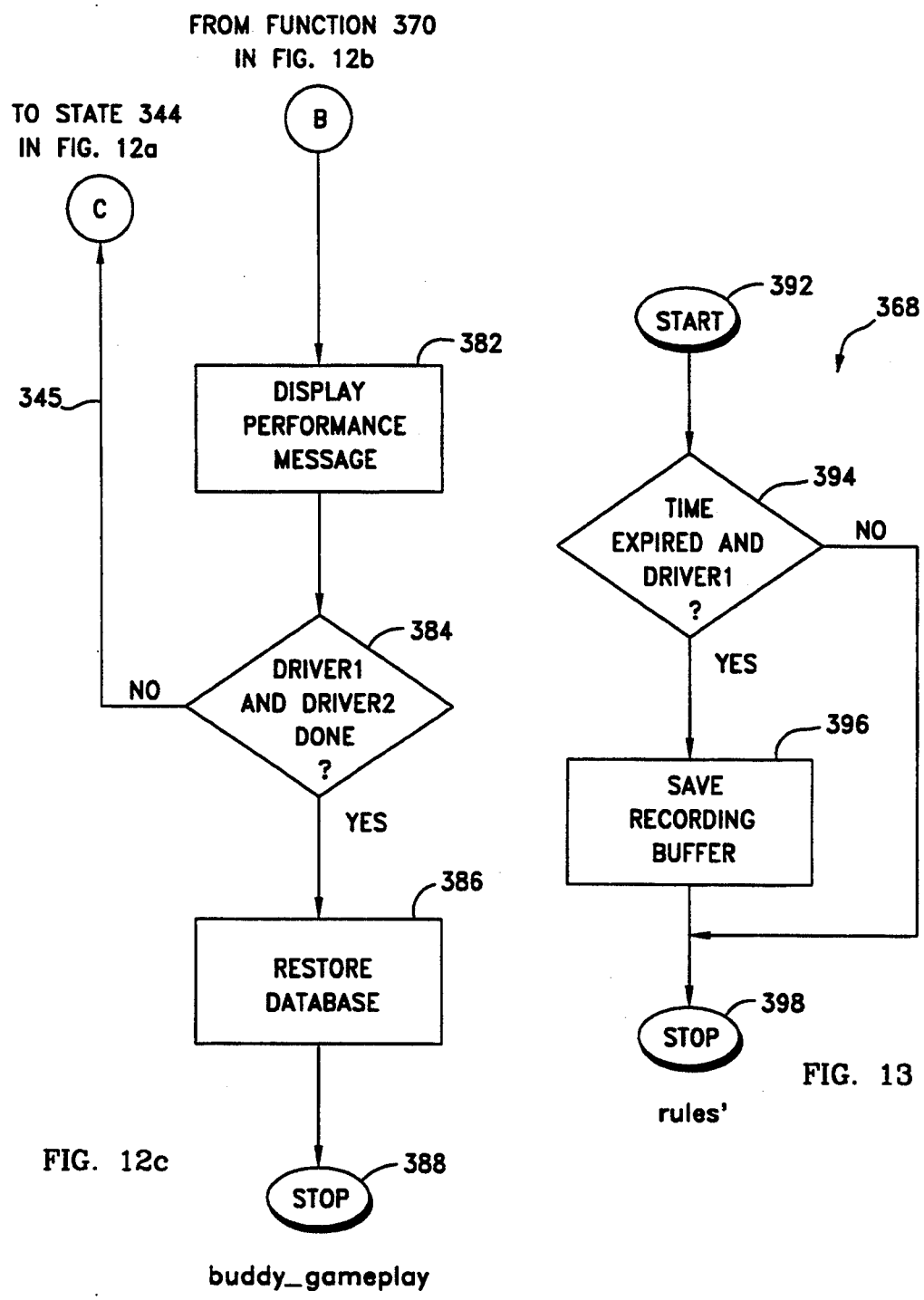

check_buddy

SYSTEM AND METHOD FOR DRIVER TRAINING WITH MULTIPLE DRIVER COMPETITION

This application is a continuation of application Ser. No. 07/739,906, filed Aug. 1, 1991, now abandoned, which is a continuation-in-part of copending application Ser. No. 07/561,087, filed Aug. 1, 1990, entitled Driver Training System, now abandoned.

RELATED APPLICATIONS

The present application is a continuation-in-part of copending application, U.S. Ser. No. 561,087, filed Aug. 1, 1990, entitled Driver Training System.

BACKGROUND OF THE INVENTION

1. Field of the Invention

The present invention generally relates to automated training and, more particularly, is concerned with vehicle simulators.

2. Description of the Prior Art

A vehicle simulator can be defined as a system that simulates the operating conditions of a vehicle in an environment. Where the vehicle simulated is a car, the environment typically includes a road. In this case the environment may also include weather conditions such as rain or snow. Besides cars, examples of other types of vehicles that may be simulated include airplanes, ships, submersibles and space vehicles.

Vehicle simulators provide the means to efficiently train vehicle operators. That is, a simulator can be used where an operator has a need to safely learn how to operate the particular vehicle being simulated. Rather than train an operator on a real-world vehicle, the simulator is used thereby avoiding accidents. Clearly, experience garnered through making mistakes on a simulator is invaluable when compared to the inherent risks of vehicle damage, and moreover, operator injury, associated with making a driving error in a real-life situation.

In some sense, a simulator achieves a balance between testing the operator's knowledge of the "rules of the road" and testing the operator's use of a vehicle. Testing the operator's knowledge is typically and conveniently accomplished through written and/or verbal examinations. However, examinations are of limited usefulness for operator training. For example, operator reflexes are not tested at all, and, moreover, such examinations do not adequately address the skills necessary for real-time decision-making.

Besides concerns for operator safety, the other alternative, actual vehicle operation, has its pitfalls too. First, the cost of instructor time may be prohibitive. Furthermore, the actual vehicle itself, such as for space or undersea operation, may simply not be available. Lastly, there is always the risk of an accident when a student is training on an actual vehicle under realistic conditions. Although a certain amount of training may occur in benign environments, for example, learning to drive a car in an empty parking lot, there comes a time, early in the operator's training, where driving in an unrealistic environment is no longer useful or practical.

Vehicle simulators address the issue of presenting the operator with a realistic training environment. The principal shortcoming of existing training systems, however, is that they do not provide realistic feedback for incremental learning. For example, in most known systems there are no means for instantaneously gauging one's progress against a prior use of the vehicle while it is in operation.

Video arcade games are another technology providing a certain degree of user feedback. Arcade games are typically placed in public areas such as arcade halls, theaters, airports and other such areas where the users can occupy time and entertain themselves by playing the game. Arcade games utilizing video displays have been around for some time now, beginning with the simplistic game of bouncing a ball across a line with paddles known as "Pong". However, with the passage of time, video arcade games have become ever more sophisticated and realistic.

Because arcade games have housings which occupy limited space, the game computer equipment is subject to strict space constraints. In addition, the user's interest must be captured and maintained by the simulator, thus requiring that processing be accomplished in real-time. The competing space and time goals thus make the task of injecting realism into the games more difficult.

In many senses, the arcade game called "Hard Drivin'™", manufactured and distributed by Atari Games Corp. of Milpitas, Calif., represents the state of the art in arcade game realism. The physical layout of the game includes clutch, brake and gas pedals, a gearshift and a steering wheel. The user, or driver, is provided feedback response from a video display having a three-dimensional graphical representation of the driving environment and from a speaker which generates realistic sounds of driving. A digital processor, comprising a number of microprocessors and a memory, is the interface between the user inputs and the feedback response.

Many current arcade games, including the one previously described, require that the user compete against some unknown "best" or "champion" player who has played the game at some point in the past. A player becomes a new champion by maximizing some metric or set of parameters and thereby displacing a previous champion. Besides the noted issue of anonymity, in most of these arcade games the only indicia of the champion's skill level is a single numeric score. Hence, there is no indication of what moves, speeds, etc., the champion used to obtain the high score. A recording of a game would be most important if the user desired to improve his skill level as against someone having greater skill at playing the game such as the champion.

Other systems have incorporated the device of connecting two arcade games together and having users compete against one another with full knowledge of who they are competing against, their actions being coordinated and displayed simultaneously. In such multiple machine configurations, a serious disadvantage is that it is costly to the proprietor since the play area doubles and the cost of machines doubles for the given game. Furthermore, these games do not present an indication of what moves an individual player needs to improve if the competing player happens to be less skillful than his counterpart.

Consequently, a need exists for realistic vehicle simulators and arcade games to provide personalized feedback, wherein the feedback may be personalized by either the operator/user or by an instructor/champion.

SUMMARY OF THE INVENTION

The present invention concerns an automated training system for use in vehicle simulators. More particularly, the invention concerns a driver training system for use in simulating vehicle operation, comprising a plurality of simulated input devices for controlling a simulated vehicle, and further comprising audio and video output devices for displaying a simulated vehicle environment.

The present invention overcomes the shortcomings of existing vehicle simulators and fulfills the need for realistic vehicle simulators by providing an automated training system with recursive training software. The invention enables a user to simultaneously compare present performance with a previously recorded performance, providing the user with real-time personalized feedback for incremental learning. In addition, the invention facilitates multi-user simulations by enabling a user to simultaneously compare a present performance with another user's previously recorded performance.

In the preferred embodiment of the present invention, a user operates mechanical input devices emulating vehicle driver controls. In one embodiment, the mechanical inputs include a gas pedal, clutch pedal, brake pedal, gearshift and steering wheel. The mechanical inputs are translated into electrical signals which are continuously processed by the invention. The invention provides computer software for modeling the position velocity and acceleration (position information) of a simulated vehicle in a simulated environment. The invention further provides computer software for driving a video display and audio device, presenting the user with real-time views and sounds of a simulated environment.

In one embodiment the user is shown a display placing the user in the position of an observer inside a simulated vehicle. The display includes a track or roadway, a simulated vehicle interior including dashboard indicators, and two or more vehicles. The position of a current driver's vehicle represents the present user's performance. The position a last driver's vehicle represents the recorded performance of a previous user. Optionally, the route of a drone vehicle can be prerecorded and played back for purpose of further competition.

The invention accomplishes a reduction in computer hardware heretofore required by multi-driver simulators by replacing additional simulators required by previous multidriver simulators with the recursive training software of the present invention. The recursive training software of the present invention displays a previous route taken by a first driver simultaneously with a present route taken by a second driver. By running successive simulations on one system, the present invention provides real-time competition between multiple users (e.g., instructor and student) at reduced cost and space requirements. Consequently, the present invention may also be embodied as an arcade game.

These and other objects and features of the present invention will become more fully apparent from the following detailed description and appended claims taken in conjunction with the accompanying drawings. It should be understood, however, that the detailed description and the specific examples, while representing the preferred embodiment of the invention, are given only for illustration and shall not limit the scope of the appended claims.

BRIEF DESCRIPTION OF THE DRAWINGS

FIG. 7 is a flow diagram of the "init_precord" function used by the "gameplay" function shown in FIG. 6;

FIG. 8 is a flow diagram of the "init_lap_car" function used by the "init_precord" function of FIG. 7;

FIGS. 12a, 12b and 12c are the flow diagram of the "buddy_gameplay" function used by the "game" function shown in FIG. 11;

FIG. 13 is the flow diagram of the "rules'" function used by the "buddy_gameplay" function shown in FIG. 12.

DETAILED DESCRIPTION OF THE PREFERRED EMBODIMENTS

Reference is now made to the drawings wherein like numerals refer to like parts throughout.

Figure 1:
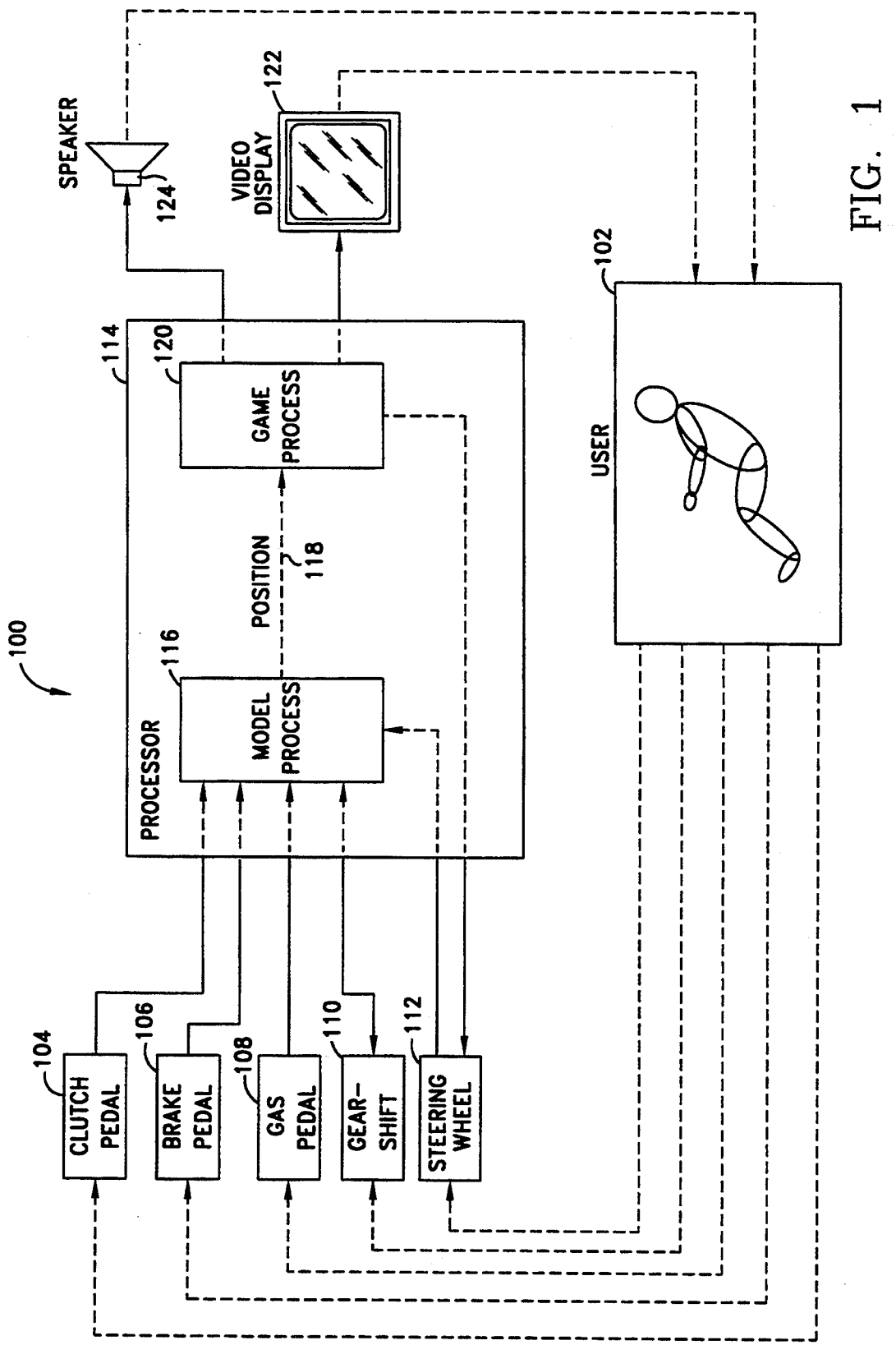
FIG. 1 is a block diagram of one preferred arcade game of the present invention.

FIG. 1 shows one preferred embodiment of a driver training system 100 of the present invention. The driver training system 100 is operated by a user or driver 102 (shown schematically), who desires to improve driving performance. It should be understood that the driver training system 100 as hereinafter described is applicable to any type of vehicle that is operated by a human. Also, the embodiment of the driver training system 100 as presented in the following figures and description is presented as an arcade game for racing. However, the present invention includes a personalized feedback response that is easily generalized to driver training systems for all kinds of simulated vehicles and types of driving.

In FIG. 1, the user 102 preferably sits in a booth or housing (not shown) such as the one described in the assignee's issued U.S. patent, entitled "Rear Entry Booth and Adjustable Seat Apparatus for a Sit-Down Arcade Video Game", U.S. Pat. No. 4,960,117. In that way, distractions are minimized and the user 102 can concentrate on self-improvement. The sitting position also better simulates the actual conditions associated with driving a car.

In the driver training system 100, the user 102 depresses a clutch pedal 104, brake pedal 106 and gas pedal 108 in the customary manner. In addition, a gearshift 110 is manipulated by the user 102 to maximize acceleration and deceleration for the given velocity of the vehicle as simulated by the simulator 100. A steering wheel 112 is turned by the user 102 so as to guide the simulated vehicle in the desired direction of travel.

The mechanical inputs provided by the user 102 to the input devices 104, 106, 108, 110 and 112 are translated by transducers into electrical signals which are fed into a processor 114. The processor 114 in the preferred embodiment includes a microprocessor (not shown) such as, for example, a Motorola 680x0. The processor 114 executes computer software which is stored in a memory (not shown) such as 27512 read-only memory (ROM) integrated circuits. The computer software in the processor 114 is logically organized to include a model process 116.

The model process 116 receives digitized signals from the input devices 104–112 and models the velocity and acceleration vectors of the simulated car. Thus, at a time T, position data, i.e., the Cartesian coordinates of the car, are determined by the model process 116. The position data is available, across a data path 118, to a game process 120. Accordingly, the game process 120 applies the "rules of the road" to the new position of the car, and initiates signals to drive a video display 122 and a speaker 124.

The video display 122 preferably generates a color, three-dimensional graphical representation of the environment, i.e., the user's perspective of a graphical universe including items such as a roadway. The speaker 124 produces sounds such as gear changes, engine revving, skidding, and so on. Thus, the user 102 is presented with real-time feedback from the output devices 122, 124 that is personalized according to his own individual performance.

Figure 2:
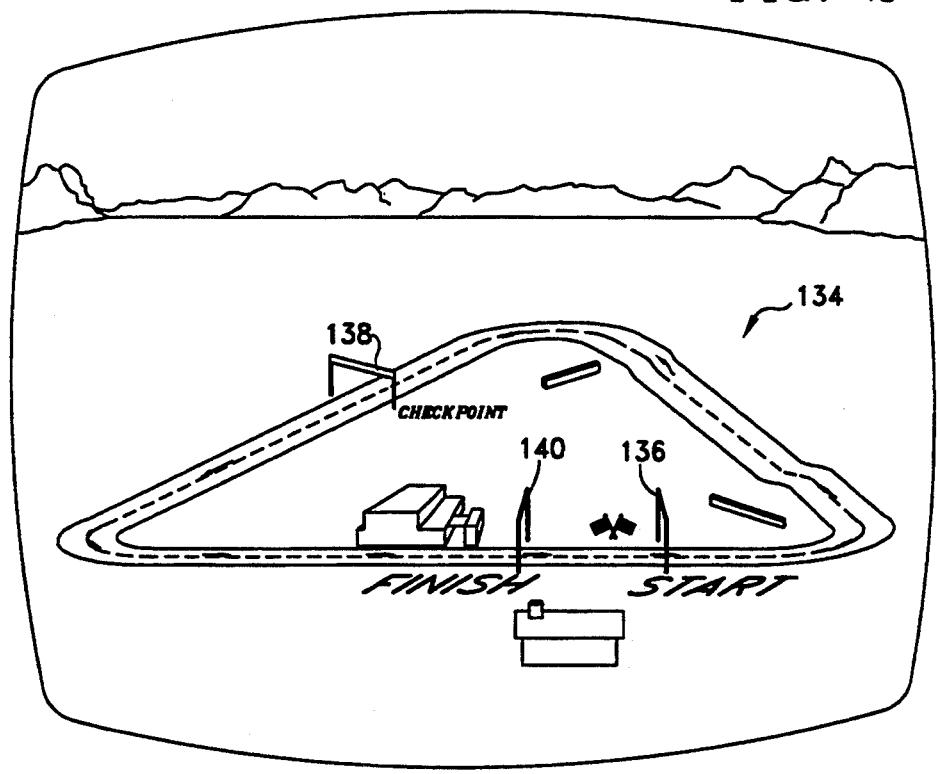
FIG. 2 is a diagram of an autocross racetrack corresponding to a video screen display provided by the arcade game of FIG. 1.

FIG. 2 is a diagram of a video screen display showing one example of a roadway, or track 134. In the embodiment of the present invention described herein, the user 102 (FIG. 1) is presented with the track 134 with a basic objective of trying to achieve better lap times while increasing his overall score. In point of fact, the user 102 presents the arcade game (hereinafter "system" to collectively describe the game and simulator embodiments) 100, with one or more coins. The system 100 then allows the user 102 a choice as to the type of track to run. The selected track can be the autocross track 134 shown in FIG. 2, a roadway having intersections and signal lights, a stunt course, and so on. As another option, and in the preferred embodiment, the system 100 allows the user 102 to select from a number of different models of the simulated vehicle. In a driver training system embodiment of the present invention, a selection of cars would preferably include simulations of the vehicles used for actual road tests.

Also shown in FIG. 2 is a start line 136, checkpoint 138 and finish line 140. When the user 102 begins the game, or initiates the system 100, the user's view is looking ahead at the start line 136 (e.g., FIG. 3). The checkpoint 138, which may be one of many (including the start and finish lines 136, 140 which are checkpoints), serves two fundamental purposes. First, a driver can increase his remaining time for playing the game by crossing the checkpoint 138 within some predetermined time, and he can increase the time of game play. Second, if the driver 102 crashes on the course near the checkpoint 138, the simulated car will be automatically reset to a position on the track 134 at the checkpoint 138. An instant replay capability shows the driver 102 what went wrong by playing back a "God's eye" view of the crash.

Figure 3:
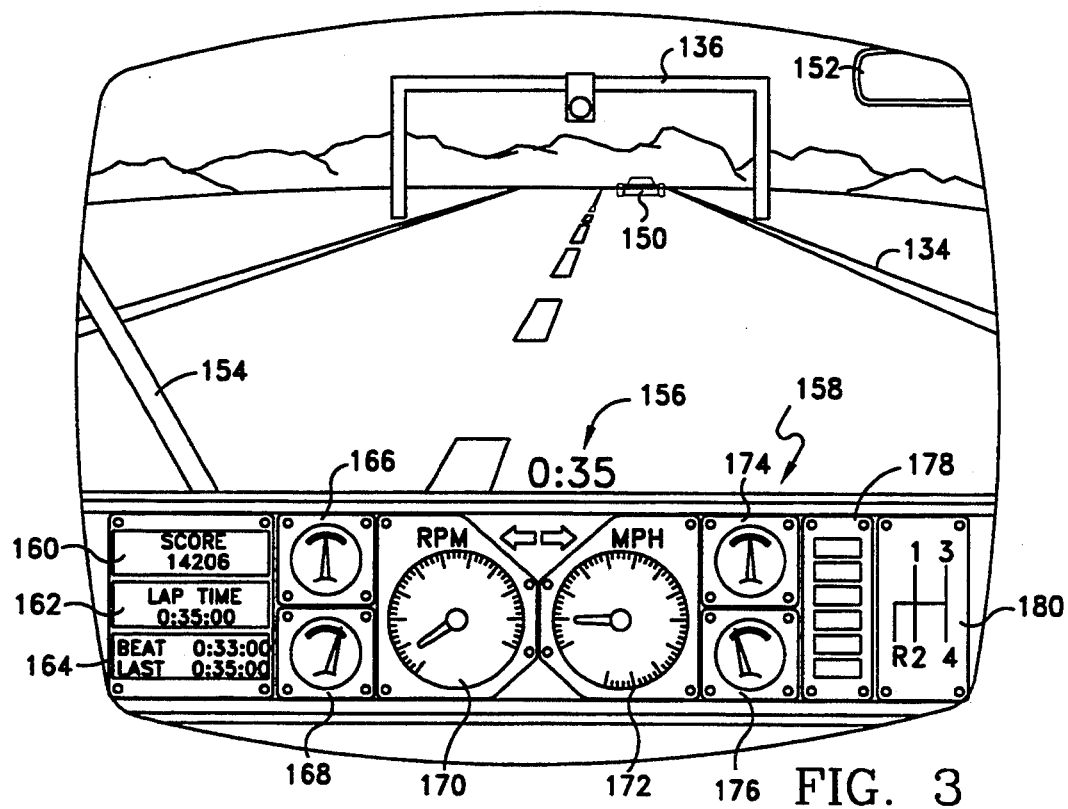
FIG. 3 is a diagram of the user's view before reaching the start line of the autocross track wherein the diagram corresponds to a video screen display of the arcade game shown in FIG. 1.

Referring now to FIG. 3, the user 102 (FIG. 1) is placed in the position of an observer inside of the vehicle being simulated. The diagram of FIG. 3 is a representation of another screen display generated on the video display 122 of FIG. 1. The scene represented in FIG. 3 is one wherein the user 102 is driving the simulation vehicle, also called the observer car (not shown), and is proceeding towards the start line 136. In a waiting position at the start line 136 is a "ghost" car or lap car 150.

The lap car 150 represents the best time around the track 134 in all the laps made by the driver 102 thus far. In this way, the driver 102 is provided with a means of self-improvement which is called recursive training. That is, at each iteration n around the track, the driver 102 tries to beat the best time accumulated in the past n−1 laps. For the arcade game embodiment of the system 100 described and shown herein, there is a single parameter of performance which is time. However, it will be understood that in other driver training systems there will be a multiplicity of parameters which may not necessarily include time. For example, a beginning driver would attempt to improve on safety parameters such as braking distances, centering the vehicle on the road, and so forth. Furthermore, in other variations of the invention the route, or position information, through the simulated environment will not be a racetrack.

The ghost car 150 thus is a complete recording of the lap that was previously run by the user 102 which represents the current "best" of n−1 laps.

To provide a higher degree of realism in the system 100, certain aspects of the interior of the vehicle are displayed on the video display 122 (FIG. 1). For example, a portion of a rear view mirror 152 is shown in the upper right hand corner of the display. Also, an A-strut 154 of the simulated vehicle is shown in the center left of the video display 122. At the bottom of the display is a remaining time message 156 which is simulated as a message on the windshield such as would be provided, for example, by a heads-up display. In the preferred embodiment, accurate time is maintained by the processor 114 by counting the interrupts generated by a four millisecond interval timer (not shown).

Directly underneath the remaining time message 156, on the video display 122, is an instrument panel 158. The instrument panel 158, in the embodiment shown in FIG. 3, includes a score display 160. The score display 160 contains a numeric indicator of the user's performance. As discussed above, the score in the score display 160 is a function of, among other things, the driver 102 reaching the checkpoint 138. Beneath the score display 160 is a current parameter display 162. Thus, in the present embodiment, once the finish line 140 (FIG. 2) has been passed, the lap time is fixed and indicates the complete time of the last lap. Of course, for training an inexperienced driver, a time parameter may be inappropriate and some other set of parameters will be used to measure the driver's performance. Beneath the current parameter display 162 is a previous parameter display 164. The previous parameter display 164 contains the time to beat, or the time to qualify for a "championship lap" (determined by the current champion), and the last lap time. The last lap time is the previous lap time achieved by the user 102.

The instrument panel 158 shown in FIG. 3 also comprises an alternator gauge 166, a temperature gauge 168, a tachometer 170, a speedometer 172, an oil pressure gauge 174 and a fuel gauge 176. The gauges become active when the user 102 "starts" the simulated vehicle. Of principal significance to this discussion are the tachometer 170, to indicate when shifting should be performed, and the speedometer 172, to provide a measurement of speed. The fuel gauge 176 reads empty when the game completes. On the right hand side of the instrument panel 158 is a set of warning lights 178 and a gear indicator 180. The gear indicator 180 visually displays the position of the gearshift 110 shown in FIG. 1.

Figure 4:
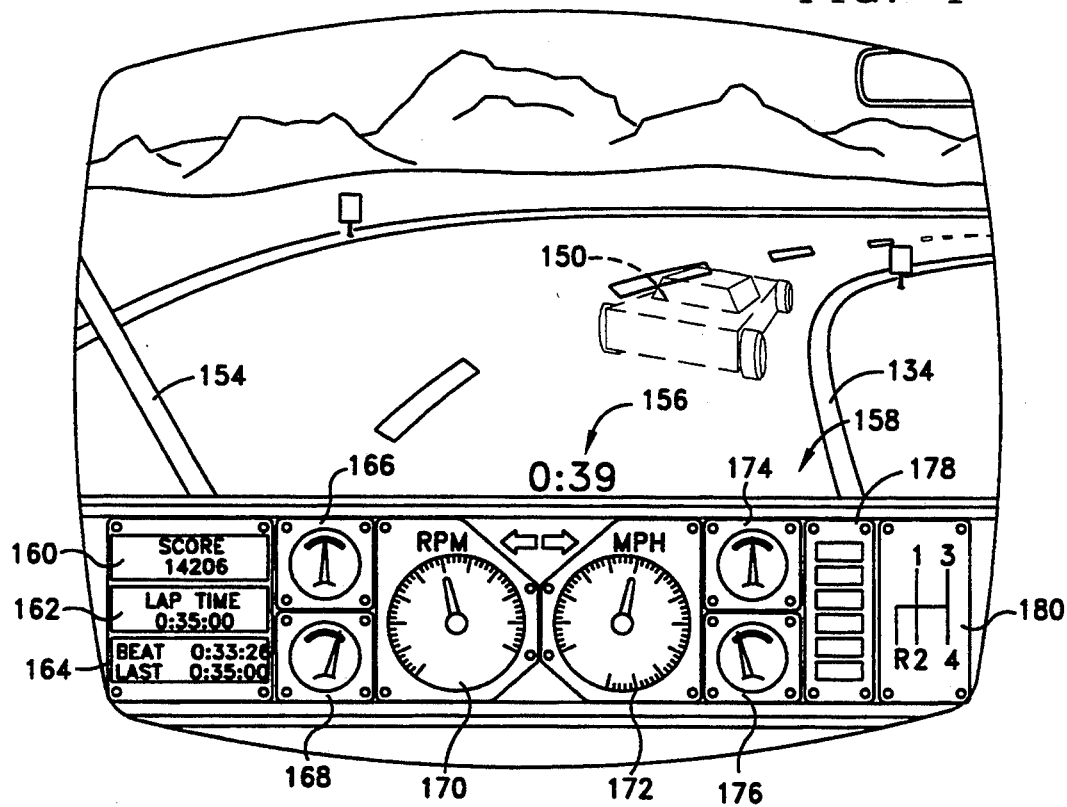
FIG. 4 is a diagram of the user's view while maneuvering around a curve in the autocross track wherein the diagram corresponds to a video screen display of the arcade game shown in FIG. 1.

FIG. 4 is another screen display wherein the lap car 150 is shown ahead of the observer car driven by the user 102. The lap car 150 is intentionally displayed as a wire frame model so that the user 102 may actually drive "through" the lap car 150 without the fear of a crash.

Figure 5:
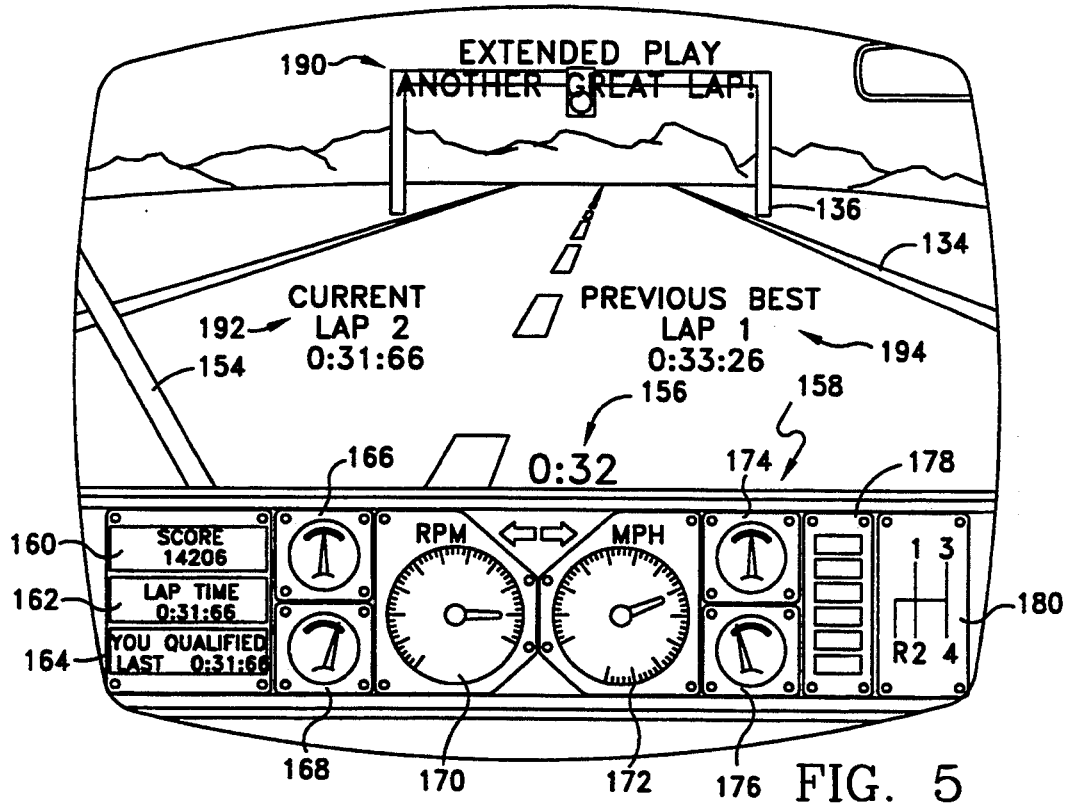
FIG. 5 is a diagram of the user's view just after crossing the finish line of the autocross track wherein the diagram corresponds to a video screen display of the arcade game shown in FIG. 1.

FIG. 5 is another screen display which is generated on the video display 122 of the system 100 (FIG. 1). The user 102 has just passed the finish line 140 (FIG. 2) and is approaching the start line 136. At the top of the screen there is displayed a predetermined feedback message 190, in this example, the words "EXTENDED PLAY—ANOTHER GREAT LAP!". Beneath the predetermined feedback message 190 there is also displayed a current lap feedback message 192 showing the current lap number and time, and a previous best lap feedback message 194 showing the previous best lap number and time.

Figure 6:
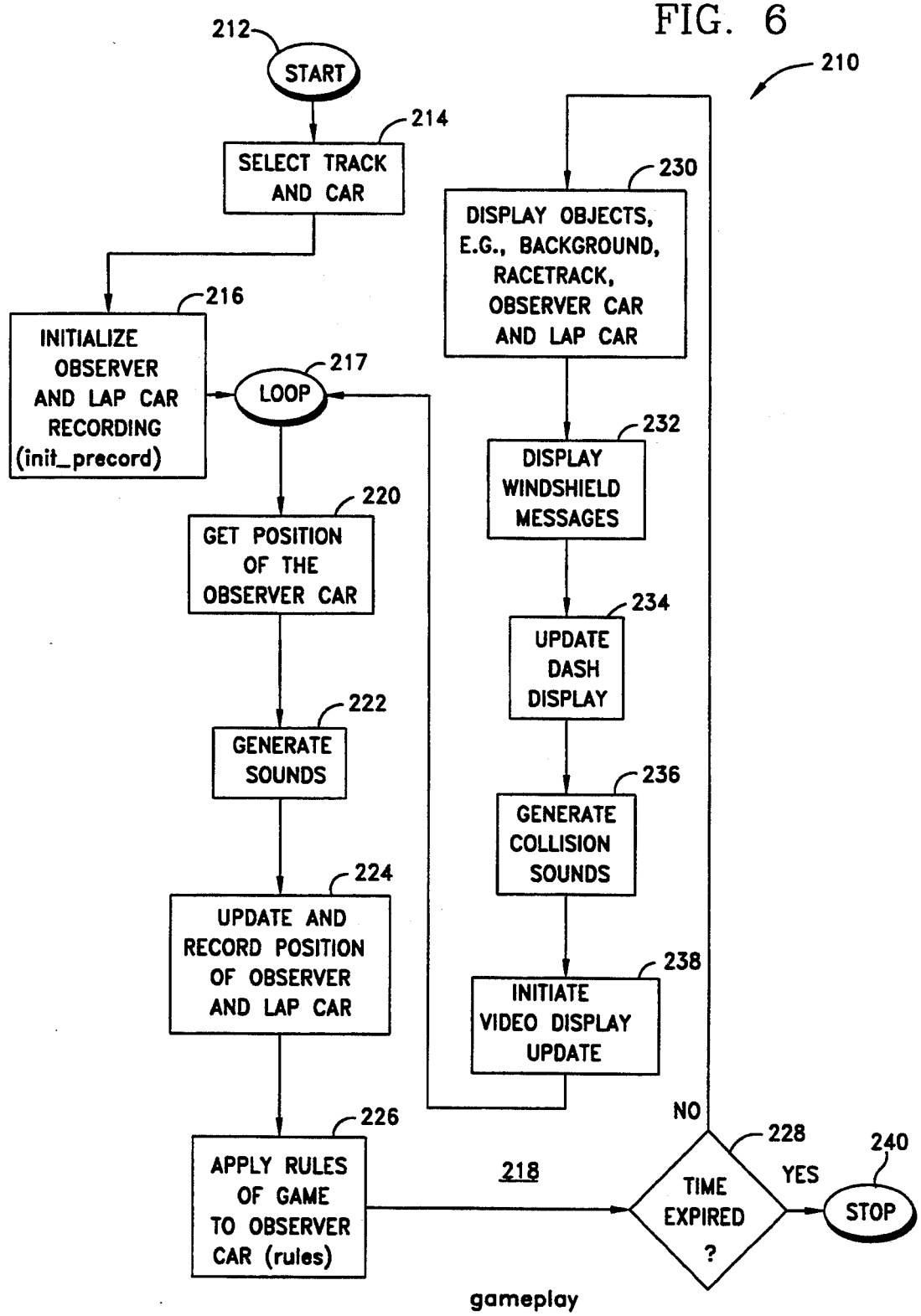
FIG. 6 is a flow diagram of the "gameplay" function which forms a portion of the game process shown in FIG. 1.

FIG. 6 illustrates the flow diagram for the top-level function of the game process 120 (FIG. 1) called "game_play" 210. In one preferred embodiment, the game process 120 is written in the "C" programming language and cross-compiled on a Digital Equipment Company VAX computer using a Green Hills Software, Inc. "C" compiler available from Oasys, a division of Xel, Inc. of Waltham, Mass. The game process 120 is then executed on a Motorola 68010 microprocessor located in the processor 114. However, one skilled in the art of computers will recognize that many other computer languages and computers, including pluralities of each, may be used to achieve the same result.

Beginning at a start state 212, the user 102 (FIG. 1) will insert money into the arcade game. Moving to a state 214 the processor 114 (FIG. 1) directs the video display 122 to display a menu of tracks from which the user 102 selects a track. Among the tracks to select are multiple player tracks and single player tracks such as the autocross track shown in FIG. 3. The user 102 is then prompted to select a car from among a menu of cars that is presented to the user.

Moving to a function called "init_precord" 216, the processor 114 initializes observer and lap car recording. The lap positions of the observer and lap cars are recorded, or saved, in unique buffers called "lap 1" and "lap 0", respectively. "Lap 0" is overwritten by "lap 1" whenever the observer car outperforms the lap car.

The processor 114 then moves to the beginning 217 of a loop 218 which terminates only when time has expired. For example, at the beginning of the game the user 102 will be given an initial allocation of time. The time allocation may be increased by crossing checkpoints, completing laps, and so forth, but eventually the game will complete. The loop 218 is preferably completed at least five times per second so that position information can be displayed in real-time providing the loop car 150 and environment with fluid movement.

At a state 220, the position of the observer car is obtained from the model process 116. The model process 116 calculates the last position of the observer car based upon the user's inputs which occur asynchronously. Moving to the next state 222, the processor 114 generates or modifies the sounds that are appropriate for the observer car, for example, skidding sounds if the observer car is losing traction on the track 134 (FIG. 2).

Next, at a state 224, the recorded positions of observer and lap cars are updated. This means that the cars are placed in a certain position in the graphical universe or environment prior to the display system of the processor 114 (FIG. 1) actually updating the video display 122. In a function called "rules" 226, the processor 114 applies the rules of the game to the observer car. For example, if the user 102 crashed, or was off-road and unable to return to the track 134 within a predetermined time, then the position of the observer car is automatically reset to the nearest checkpoint.

At this point in the loop 218, moving to a decision state 228, the processor 114 checks to see whether time has expired. The time checked is the same allowed the user 102 by the system 100. This time is presented to the user 102 in the remaining time message 156 (FIG. 3).

Next, moving to a state 230 if time has not expired, a display command is initiated to a digital signal processor (not shown) in the processor 114 (FIG. 1), such as the ADSP-2100 chip available from Analog Devices of Norwood, Mass. In this state 230, display objects, such as the racetrack, background, observer car and lap car, are appropriately translated in the graphical universe according to the perspective of the user 102, for later display on the video display 122. In a state 232, windshield messages are displayed such as, for example, at the beginning of the game, checkpoints and the end of the game and the remaining time message 156 (FIG. 3) are displayed. Also, if the observer car goes off-road (i.e., off of the track 134), the system 100 displays arrows that point the user 102 in the direction of the track 134 (FIG. 2). Moving to a state 234, the lap time 162, score display 160 and gauges, including the tachometer 170 and speedometer 172, are updated. Then, at a state 236, collision sounds are generated. These are the sounds associated with the observer car colliding with barriers, cones, buildings, and the like. At a state 238, the video display 122 has its three-dimensional graphics display updated by a command being issued to a graphics signal processor such as, for example, the 34010 chip distributed by Texas Instruments, which can handle color filled three-dimensional graphics in real-time.

Returning to the decision state 228, if time has expired, the current session is terminated in a stop state 240.

Referring now to FIG. 7, there is illustrated the flow diagram for the "init_precord" function 216 shown in FIG. 6. Beginning at a start state 250, the processor 114 (FIG. 1) moves to a state 252 to create the graphical object called the observer car. The observer car object is created because there are times, for instance, after a crash during instant replay, when the system 100 zooms out of the observer car to show the user 102 the scene as from the point of view of a third party observer. At a state 254, the processor 114 creates the graphical object called the lap car, e.g., the car indicated at 150 in FIG. 4. Moving to a function called "init_lap_car" 256, lap car recording information is initialized in the circular buffer called "lap 0". Then, in a state 258, the position of the observer car object is set to the edge of the universe so that it is not seen on the video display 122 (until instant replay time, for example).

The lap car best time is initialized after the processor 114 moves to a state 260. The best time is set to be the highest possible time allowed by the system, e.g., 7FFFFFFF in hexadecimal notation. Thus, after the first lap, assuming there was not a crash or the user 102 did not abort the lap (the user may abort a lap by pushing an abort button (not shown)), the observer car will automatically become the new lap car with the first lap time displayed in the previous parameter display 164 shown in FIG. 3. The function 216 then terminates at a stop state 262.

Figure 9:
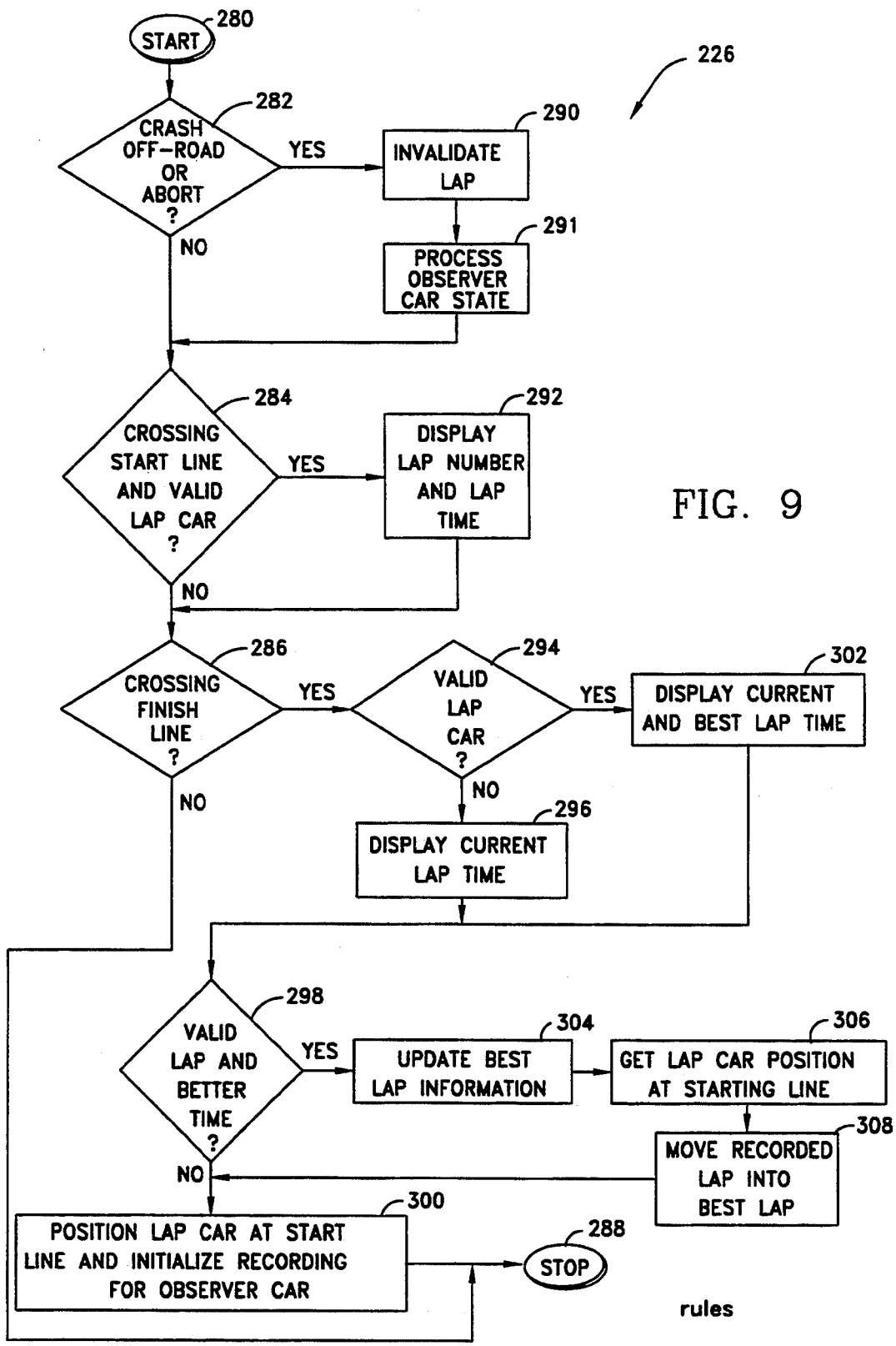
FIG. 9 is a flow diagram of the "rules" function used by the "gameplay" function shown in FIG. 6.

FIG. 8 illustrates the flow diagram for the "init_lap_car" function 256 shown in FIG. 7. The "init_lap_car" function 256 is entered at a start state 270 by the processor 114 (FIG. 1) at the beginning of each game as shown in FIG. 7, and also at the end of a lap if a new lap car is to be recorded as shown in FIG. 9. At a state 272, pointers to the lap car recording buffer "lap 0", such as the last lap position, are reset. Also a playback flag is reset to indicate that the buffer does not contain valid information and therefore should not be displayed. The "init_lap_car" function 256 terminates in a stop state 274.

FIG. 9 illustrates the flow diagram for the "rules" function 226 shown in FIG. 6. Beginning at a start state 280, the processor 114 (FIG. 1) moves to a decision state 282. Among the functions carried out by "rules" 226 is the "replacement" function when the observer car goes off-road for more than some predetermined time, ten seconds, for example, the car is replaced onto one of the checkpoints such as the checkpoint 138 shown in FIG. 2. At a decision state 282, if the observer car is not crashed, not off-road and the game has not been aborted, a decision state 284 tests whether the observer car is crossing the start line and there is a "valid" lap car. By valid, it is meant that the car did not crash and the lap was not aborted. If the lap car is valid, then another test is made to determine whether the observer car is crossing the finish line at a decision state 286. If the observer car is not crossing the finish line, then processing for the "rules" function terminates at a stop state 288.

Referring back to the state 282, if the observer car is either crashed, off-road or the lap was aborted, then the processor 114 moves to a state 290 to invalidate the lap and continues processing at the state 284. Moving to a state 291, the processor 114 processes the observer car state, such as resetting the observer car to the nearest checkpoint if the observer car was crashed.

If at the decision state 284 the lap car is crossing the start line and there is a valid lap car, then the lap number and lap time are displayed at a state 292 and control returns to the decision state 286.

Referring back to the decision state 286, if the observer car is crossing the finish line, the processor 114 moves to a decision state 294. If, at the decision state 294, there is no valid lap car, then the current lap time is displayed at a state 296 and control continues to a decision state 298. In the decision state 298, the processor 114 tests whether it is a valid lap and a better time was run. If not, then control moves to a state 300 to position the lap car at the start line and initialize recording for the observer car. State 300 uses the "init_lap_car" function shown in FIG. 8. At this point in the processing, the user 102 sees the rear-end of the lap car as, for example, shown in FIG. 3.

Referring back to the decision state 294, if there is a valid lap car then the processor 114 moves to a state 302 to display current and best lap times, e.g., the messages 192 and 194 in FIG. 5, before entering the decision state 298.

From the decision state 298, if it is a valid lap and a better time was achieved, then the processor 114 moves to a state 304 to update the best lap information. Moving next to a state 306, the processor 114 gets the lap car position at the starting line and stores the position and, at a state 308, moves the recorded lap buffer information stored in "lap 1" into the best lap buffer "lap 0", moving from the state 308 to the state 300 and proceeding as described above.

Figure 10:
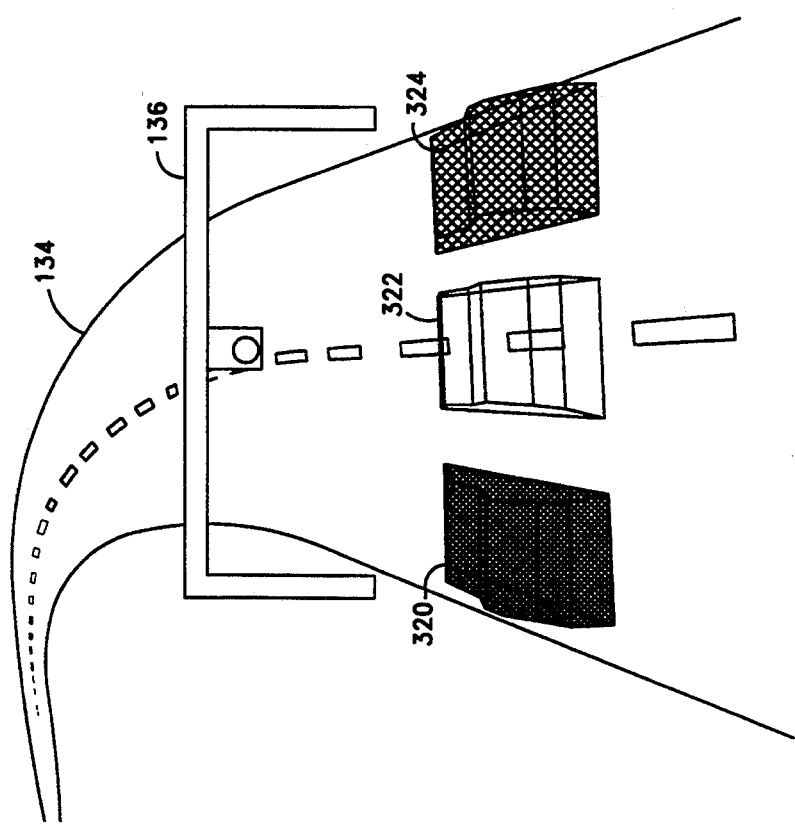
FIG. 10 is a diagram of the user's view at the start line of the multiple driver simulation wherein the diagram corresponds to a partial video screen display of the arcade game shown in FIG. 1.

FIG. 10 illustrates the user's view of the multiple driver simulation of the present invention. In particular, the start line 136 on the track 134 is shown in FIG. 10. The multiple driver simulation allows the user to control a current driver's car 320 which competes against a drone car 322 and a last driver's car 324. The competition is judged based on a set of parameters, such as time and/or points, as was previously discussed with respect to the recursive driver simulation, e.g., gameplay 210, which will hereinafter be referred to as the single driver simulation.

Multiple driver simulation is characterized by self-improvement through competition with another driver. In the arcade game embodiment of the present invention, a first player (or user) will compete against the drone car 322. At that time, only the drone car 322, having an associated prestored route through the graphical universe, and the current driver's car 320 under the control of the first player, are displayed on the video display 122. After the first player's competition is finished, and before the game ends, the second player takes the controls and a view such as FIG. 10 is presented by the driver training system 100. The first player's route through the graphical universe has been recorded in the memory of the processor 114 (FIG. 1) and this recording is played back as the last driver's car 324 so as to affect a competitive environment for the second player who now controls the current diver's car 320.

In the simulator embodiment of the driver training system 100, or other such simulation system, typically the first driver will be the instructor and the second driver will be the student. The details of the preferred arcade game embodiment of the multiple driver simulation will now be described hereinbelow, although the applicability to a simulator embodiment will be understood.

Figure 11:
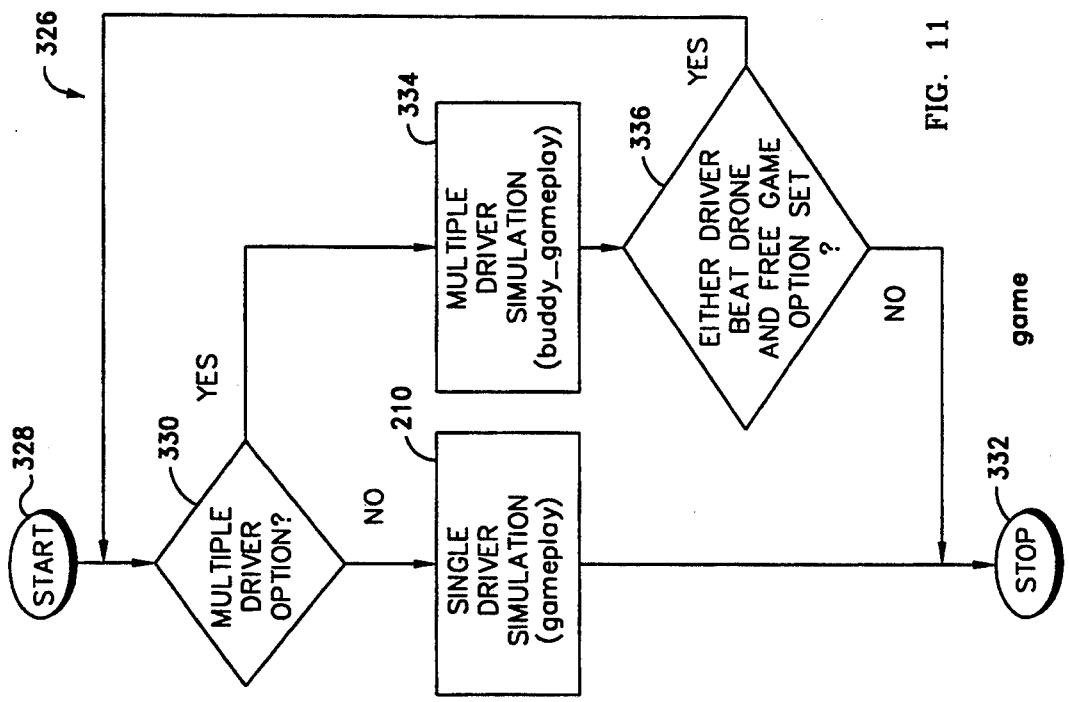
FIG. 11 is a flow diagram of the "game" function which forms a portion of the game process shown in FIG. 1.

With reference now to FIG. 11, a flow diagram is shown for an integrated arcade game 326 that includes the features of the single and multiple driver simulations. The game 326 begins at a start state 328 and proceeds to a decision state 330, wherein the game 326 prompts the user 102 (FIG. 1) to select between the single and multiple diver simulations. If the user 102 selects the former, then the game 326 enters the single driver simulation function (gameplay) 210 as previously described, and upon termination of the function 210 the game 326 completes at the stop state 332.

Otherwise, assuming the user 102 selects the multiple driver option, the game 326 enters a multiple driver simulation function (buddy_gameplay) 334. (This simulation function 334 is further discussed in some detail below.) Upon termination of the simulation function 334, the game 326 enters the decision state 336 wherein a status variable (not shown) is checked to determine whether either driver, as represented by the cars 320, 324 (FIG. 10), beat the drone car 322 and, in addition, if a free game option variable (not shown) is set. In this arcade game embodiment, the operator (not shown) of the arcade game may selectably set a free game option. If the test at the decision state 336 is satisfied, then the game 326 continues in a loop back to the state 330 for a free game. Otherwise, the game completes by moving from the decision state 336 to the stop state 332.

Figure 12A:
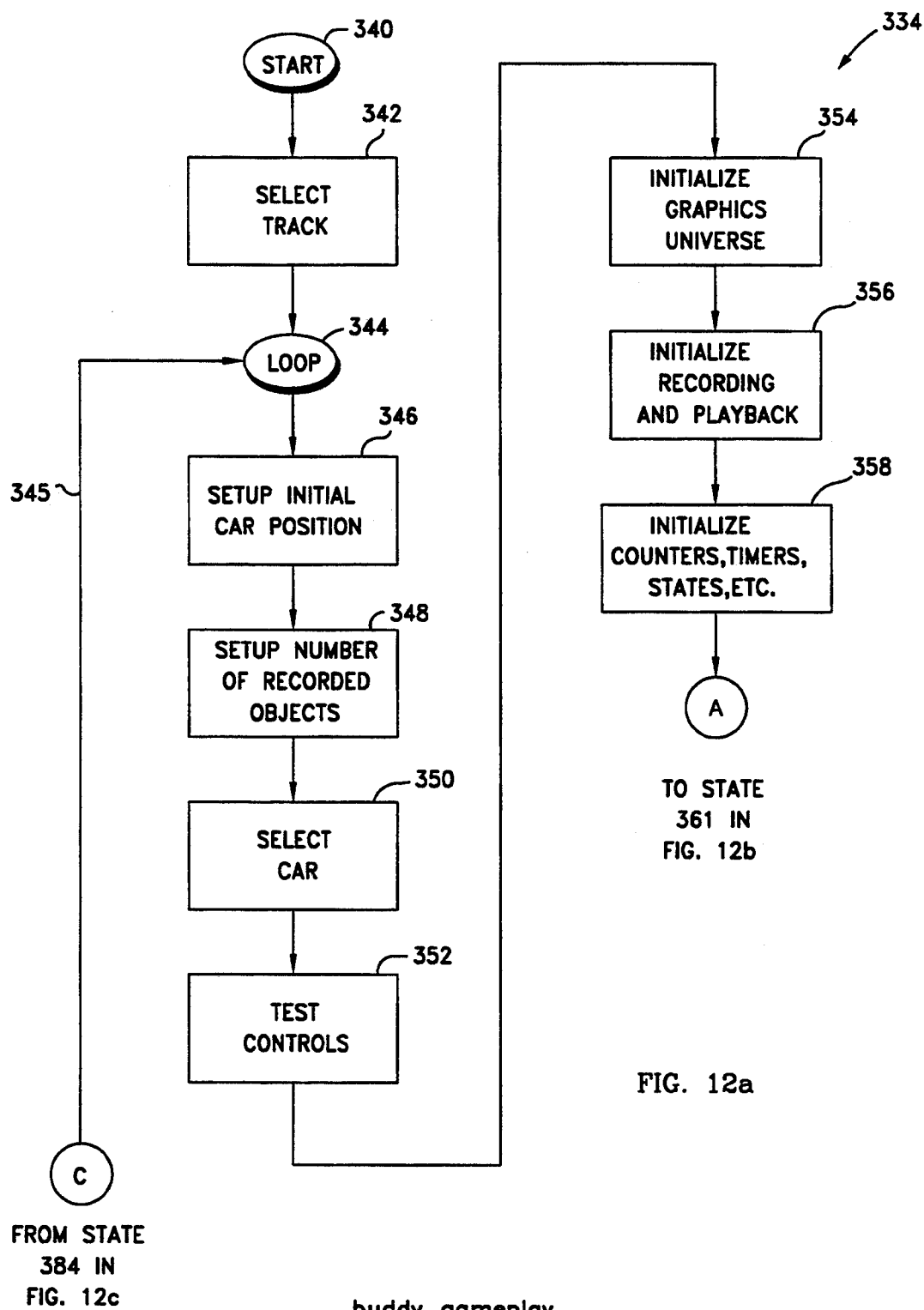
Figure 12B:
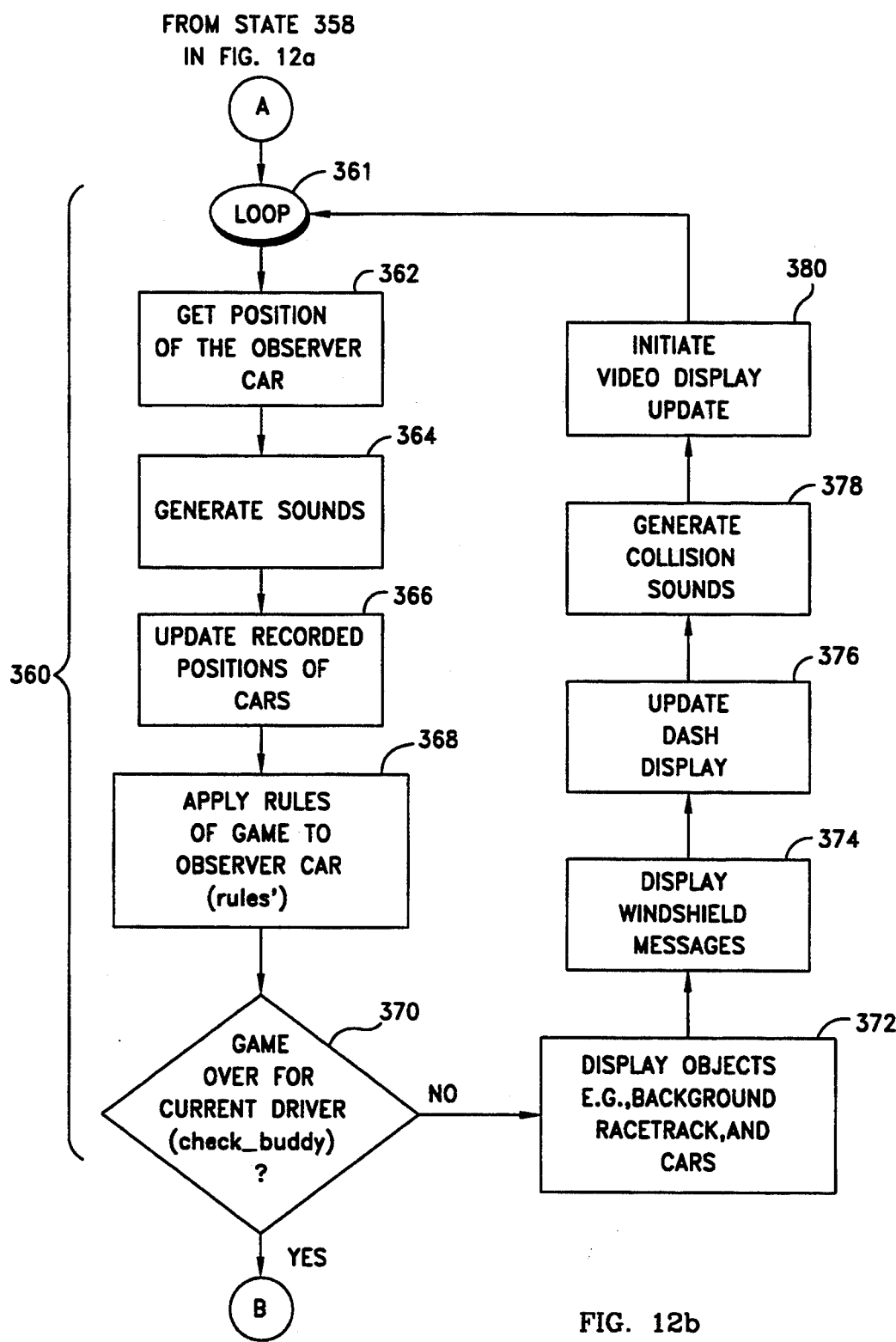

Referring to FIGS. 12a, 12b and 12c, the flow of multiple player simulation function (buddy_gameplay) 334 is elaborated. More particularly, referring to FIG. 12a, the multiple player simulation function 334 begins at a start state 340. Moving to a state 342, the function 334 requests that the user select a track. For example, in the presently preferred embodiment, the tracks that the user may select from include the same tracks as discussed hereinabove. The selected track, such as the track 134 shown in FIG. 10, is a computer simulated representation of a physical track on which actual cars are driven.

The next sequence of states, 344–384, form an outer loop, denoted in FIG. 12a by the return of control path 345 to the loop state 344. The outer loop 345 may be repeated one or more times until both of the cars 320, 324 have completed the multiple player simulation function 334.

After entering the outer loop 345 at the loop state 344, the function 334 moves to a state 346 to set up the initial car position. That is, the initial car position will be on either the lefthand side or the righthand side of the drone car 322 (FIG. 10). For example, as currently configured, the first player's car will appear as the current driver's car 320 on the lefthand side of the drone car 322. When the second player begins play, a recording of the first player's car begins as the last driver's car 324 on the righthand side of the drone 322, and the second player is assigned to the current driver's car 320.

Proceeding to a state 348, the buddy_gameplay function 334 sets up the number of recorded objects that will be moved around the track 134. For example, when the first player plays the game, the number of recorded objects is set to "1" so that only the drone car 322 is played back, and when the second player plays the game, the number of recorded objects is set to "2" so that the drone car 322 and last player's car 324 are played back. Next, the function 334 moves to a state 350 wherein the user 102 (FIG. 1) is requested to select a type of car to be driven. In one presently preferred embodiment, the user may select from among four cars with certain preselected mechanical and performance characteristics as follows: automatic transmission; manual transmission; convertible roadster, which has somewhat better handling characteristics than the other cars; and speedster, which is somewhat faster than the other cars but may not handle as well. The buddy_gameplay function 334 next transitions to a state 352 to test the controls of the driver training system 100 (FIG. 1), including the clutch 104, the gearshift 110 and the brake 106. At this point the function 334 may reconfigure the car or stop play for operator assistance. If the clutch 104 returns an error condition, for example, and the user 102 has chosen a car with a manual transmission, (i.e., manual shifting cannot be simulated), then the function 334 automatically reconfigures the car to have an automatic transmission such that the user 102 can still play the game.

To determine an error condition, an operator would, prior to the beginning of the simulation, or game, use an operator menu (not shown) to determine that a control is malfunctioning and so enter that information into the system 100. The operator opinion is tested by the test controls state 352 and acted upon accordingly.

The buddy_gameplay function 334 then moves from the test control state 352 to an initialize graphics universe state 354 wherein the cars 320, 322 and 324 (FIG. 10) are displayed on the track 134 and the camera zooms in to the start line 136. Proceeding to the state 356, the function 334 initializes recording and playback. Recording at state 356 is set up similarly to the state 216, as shown and discussed with regard to FIG. 7 above. For playback, if the first player is operating the system 100, only the drone car 322 is played back. If the second player is operating the system 100, then both the first player's recorded route and the drone car 322 are played back. A separate, prestored route of the drone car 322 is required for each track, and the playback route of each drone is stored in a ROM in the processor 114 (FIG. 1). The buddy_gameplay function 334 next transitions to a state 358 wherein various initialization is performed including zeroing lap counters, zeroing the time for the game, and zeroing the state flags for each car.

Leaving the state 358, the buddy_gameplay function 334 proceeds to enter an inner loop 360 at a loop state 361 as shown in FIG. 12b. The inner loop 360 comprises the states 361–380, which is terminated at a decision function (check_buddy) 370. From the state 361, the function 334 enters sequentially the get position of the observer car state 362, generate or modify sounds state 364, and update recorded positions of cars state 366, which are similar in function, respectively, to the states 220, 222 and 224 in the gameplay function 210, discussed above with respect to FIG. 6. After getting the position of the observer car, generating sounds and updating the recorded positions of the cars, the buddy_gameplay function 334 proceeds to a rules' (or rules prime) function 368 to apply the rules of the game to the observer car. The rules' function 368 differs from the rules function 226, which was shown and discussed with reference to FIG. 9 above. The function 368 will be further discussed hereinbelow with reference to FIG. 13.

Still referring to FIG. 12b, the function 334 continues from the state 368 to the decision function 370 to check whether the game is over for the current driver. The check_buddy function 370 will be discussed hereinbelow with reference to FIG. 14.

In FIG. 12b, the buddy_gameplay function 334 continues to a state 372, after it has been determined that the game is not over for the current driver, and the function 334 proceeds through the following sequence of states: display objects 372, display windshield messages 374, update dash display 376, generate collision sounds 378, and initiate video display update. The functions of the audiovisual generation states 372–380 are similar, respectively, to the sequence of states 230–238, which were shown and described with respect to the gameplay function 210 of FIG. 6. After initiating the video display update at the state 380, the buddy_gameplay function 334 returns to the loop state 361 to continue the inner loop 360.

Referring now to FIG. 12c, the buddy_gameplay function 334 moves from the decision function 370 (FIG. 12b) to the state 382 if the game is over for the current driver. At the state 382, a performance message is displayed. In the presently preferred embodiment, the performance message may be a disqualification message if driver1 was controlling the current car 320 (FIG. 10) and did not finish the race. However, if driver1 or the drone crosses the finish line within a specified period (as preselected by the programmer of the system 100), such as 10 or 15 seconds, before driver2, then a message indicating that driver2 is disqualified is displayed.

Moving to a decision state 384, the function 334 determines whether driver1 and driver2 have finished the race. If only driver1 has completed the course, then control proceeds across the return path 345 to the top of the outer loop at the loop state 344 after saving the recording buffer for driver1, and driver2 is allowed to drive the car 324. If, on the other hand, driver1 and driver2 have completed the game, the function 334 proceeds from the decision state 384 to a state 386 to restore the database associated with the buddy_gameplay function 334 (e.g., all cars are removed from the track 134 and the camera or observer position is reset to the start line 136). The function 334 then proceeds to a stop state 388 to complete the function.

Turning to FIG. 13, the control flow for the rules' function 368 (FIG. 12b) will now be discussed. The rules' function 368 specifies the rules of the game for the buddy_gameplay function 334. The rules' function 368 begins at a start state 392 and proceeds to a decision state 394 wherein a test is made to determine whether a predetermined lap time has expired and driver1 is driving (FIG. 10). This condition at state 394 basically specifies whether driver1 has finished. This is because, in the present embodiment, when the drone car 322 (FIG. 10) crosses the finish line, the current car controlled by driver1 has a preselected time such as 10 seconds to finish the game, otherwise driver1 is disqualified. If the game has not terminated, then the buddy_gameplay function 334 continues and terminates the rules' function 368 at a stop state 398 without recording the lap for driver1.

Otherwise, if at the decision state 394 time has expired and driver1 controls the current car 320, then the function 334 moves to a state 396 to fill out and save the recording buffer for driver1. The recording buffer is filled out by repeating the last position of the current car 320 into the recording buffer. Thereafter, the rules' function 368 is terminated at the stop state 398.

Figure 14:
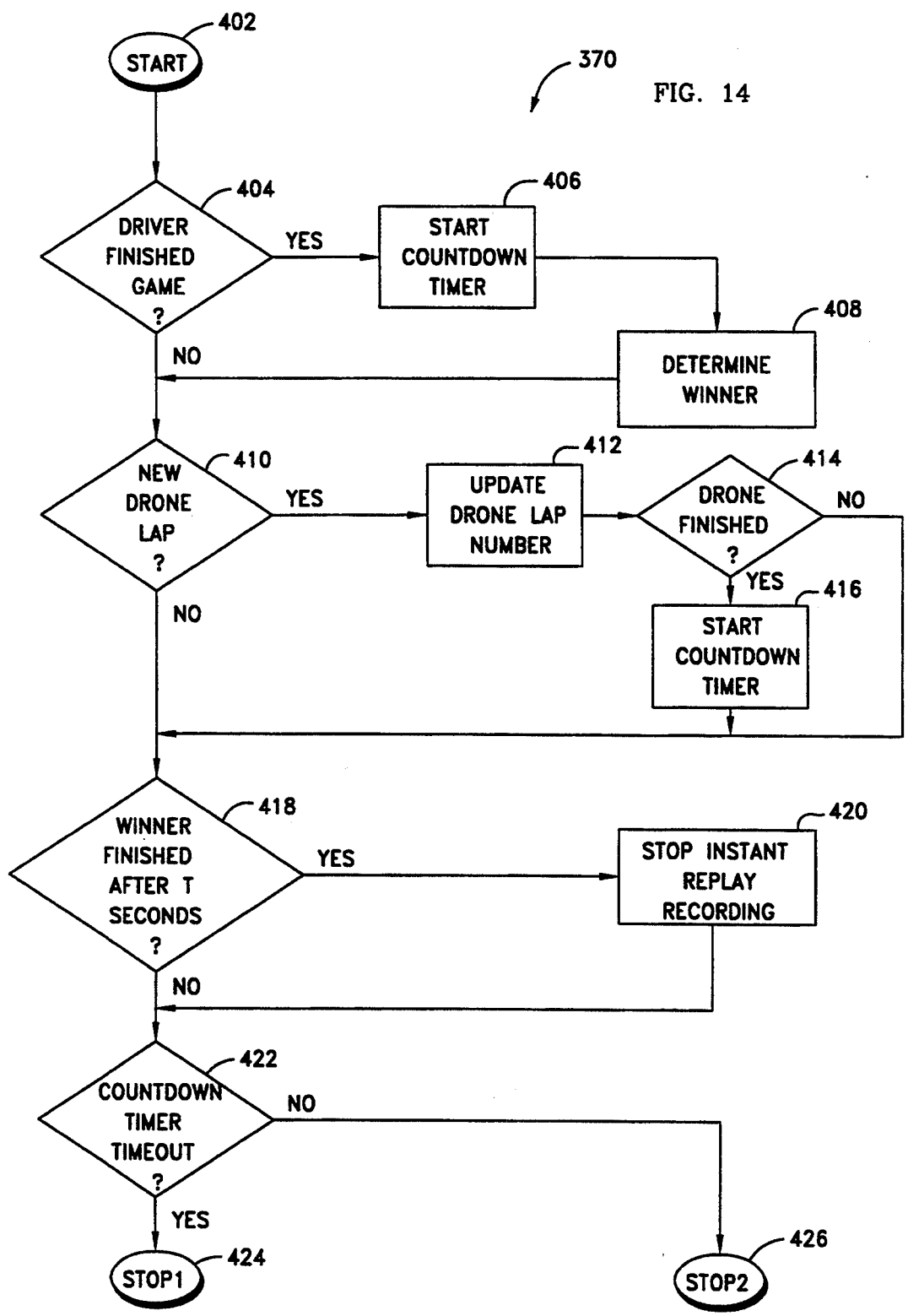
FIG. 14 is the flow diagram of the "check_buddy" function used by the "buddy_gameplay" function shown in FIG. 12.

FIG. 14 illustrates the control flow for the check_buddy function 370 which is a decision function for the buddy_gameplay function 334 shown in FIG. 12b. The check_buddy function 370 serves to determine whether a game is over for the current driver whose route across the track 134 is replayed and visually presented by the car 320 (FIG. 10).

The function 370 is entered by the buddy_gameplay function 334 at a start state 402, whereafter control proceeds to a decision state 404. At state 404, the function 334 tests whether the current driver has finished the game. If the condition at state 404 is satisfied, then the function 334 moves to a state 406 to start a countdown timer (not shown). The countdown timer is used to specify the disqualification time noted hereinabove. Thereafter, at a state 408, the winner of the game is determined. Of course, the winner cannot yet be determined if driver2 has not yet operated the game.

Now if, on the other hand, at the decision state 404 it is determined that the driver has not finished the game, or if the function 334 is at the state 408, the function 334 transitions to a decision state 410 to determine whether the drone car 322 (FIG. 10) has started a new lap, i.e., if the car 322 crossed the start line 136. If so, the drone lap number is updated at a state 412 and, moving to a decision state 414, a test is made as to whether the drone car 322 has finished. If the drone car 322 has finished, then the countdown timer is started at a state 416 and the function 334 proceeds to a decision state 418. If, at state 414, it is determined that the drone did not finish, then the function 334 moves directly from state 414 to the decision state 418.

At the decision state 418, a test is made to determine whether the winner finished after T seconds from a finish by the drone car 322. T is a preselected time that specifies whether there is an instant replay of the finish. If the test is affirmative, then the function 334 proceeds to a state 420 to stop the instant replay recording since the winner and drone car 322 will not have had a close race. From the state 420, or if the test at state 418 is negative, then the function 334 proceeds to a decision state 422 to determine whether there is a countdown timer time-out, i.e., disqualification. If there is a time-out, the function 334 proceeds to a stop1 state 424 which terminates the inner loop 360 of FIG. 12b. Otherwise, if there is no time-out at the decision state 422, the function 343 terminates the check_buddy function 370 at a stop2 state 426. The stop2 state 426 corresponds to continuing the inner loop 360 of FIG. 12b.

Although the preferred embodiments of the present invention have been principally shown and described as relating to arcade games, the present invention could also be used as a vehicle simulator such as a driver training system.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A driver training system, comprising:
   a plurality of simulated input devices for controlling a simulated vehicle;
   a video display for presenting a view of a simulated environment;
   modeling means responsive to said input devices for determining position information of said simulated vehicle in said simulated environment;
   first training means having a buffer, wherein the first training means stores and replays a first preprogrammed route through said simulated environment on said video display;
   second training means having a buffer, wherein the second training means is representative of a first user and responsive to the position information provided by the first user, and wherein the second training means stores a second route of said simulated vehicle taken by the first user through said simulated environment in the buffer, replays the second route on said video display, and stores at least one parameter indicative of a performance characteristic of the second route in the buffer; and
   third training means, representative of a second user, wherein the third training means is responsive to the position information provided by the second user, and wherein the third training means displays a third route of said simulated vehicle taken by the second user through said simulated environment and determines at least one parameter indicative of a performance characteristic of the third route;

wherein said first preprogrammed route is independent of the routes taken by the users;

wherein said first route and said second route are replayed simultaneously with said display of said third route on said video display; and wherein a best route through the simulated environment is selected by comparing route parameters.

2. The system defined in claim 1 wherein said input devices include a gas pedal, brake pedal and steering wheel.

3. The system defined in claim 2 wherein said input devices further include a gearshift.

4. The system defined in claim 3 wherein said input devices further include a clutch pedal.

5. The system defined in claim 3 wherein said steering wheel is responsive to a plurality of feedback signals from said second and third training means.

6. The system defined in claim 1, additionally comprising a speaker responsive to said second and third training means.

7. The system defined in claim 1, wherein said second and third training means are responsive to different position information provided by different users.

8. A system for driver training, comprising:
a plurality of simulated controls having analogues to controls of a real-world vehicle;
a visual device;
a processor responsive to said simulated controls for generating personalized feedback to a present user, including a simulated environment, a simulated vehicle having a preprogrammed route through said simulated environment, a present simulated vehicle having a present route through said simulated environment taken by said present user, wherein the present route has a parameter indicative of performance, and a previous simulated vehicle, wherein the previous simulated vehicle is a recording of a previous route taken by a previous user through said environment, wherein the previous route has a parameter indicative of performance, wherein the preprogrammed route is independent of the routes taken by the users, and wherein said personalized feedback is communicated to said visual device for presentation to said present user; and
means for comparing said parameters of said previous route and said present route, and wherein said present route is selected as a best route only if the present route parameter indicates a higher level of a performance than the previous route parameter.

9. A method of driver training in a driving simulator having a video display, a memory, a set of simulated input controls, and means for displaying a simulated vehicle in a simulated environment, the method comprising the steps of:
storing a preprogrammed route of a first simulated vehicle through the simulated environment;
receiving changes in the position of the simulated input controls as manipulated by a first user;
calculating position information of a second simulated vehicle based on the position changes of the simulated input controls;
storing the calculated position information indicative of the first user's route through the simulated environment in the memory;
displaying the first simulated vehicle, the second simulated vehicle and simulated environment on the video display;
receiving changes in the position of the simulated input controls as manipulated by a second user;
calculating position information of a third simulated vehicle based on the position changes of the simulated input controls as manipulated by the second user; and
displaying the stored positions indicative of the first simulated vehicle and the first user's route of the second simulated vehicle on the video display simultaneously with the position of the third simulated vehicle.

10. A driver training system, comprising:
means for providing user control of a simulated vehicle;
a video display for presenting a view of a simulated environment;
means, independent of the user control means, for controlling simulated travel of a first simulated vehicle through the simulated environment;
means, responsive to input from a first user, for controlling simulated travel of a second simulated vehicle through the simulated environment;
means, responsive to the means for controlling simulated travel of the second simulated vehicle, for storing a record of the simulated travel of the second simulated vehicle through the simulated environment;
means for simultaneously displaying the simulated travel of the first and second simulated vehicles on the video display;
means, responsive to input from a second user, for controlling simulated travel of a third simulated vehicle through the simulated environment; and
means for simultaneously display the simulated travel of the first, second and third simulated vehicles on the video display.

* * * * *